United States Patent [19]

Ohlhauser

[11] Patent Number: 4,922,642
[45] Date of Patent: May 8, 1990

[54] LONG GUN MUZZLE TETHER AND PROTECTOR

[76] Inventor: Bradley D. Ohlhauser, 1016-½ N. 11th St., Bismarck, N. Dak. 58502

[21] Appl. No.: 375,537

[22] Filed: Jul. 3, 1989

[51] Int. Cl.⁵ .............................................. B60R 11/00
[52] U.S. Cl. .......................................... 42/96; 211/64; 224/275
[58] Field of Search ............ 42/96; 211/64; 224/273, 224/275, 913

[56] References Cited

U.S. PATENT DOCUMENTS

| 2,287,805 | 6/1942 | Johnson | 211/64 |
| 2,545,473 | 3/1951 | Kremkau | 42/96 |
| 2,558,792 | 7/1951 | Snowden | 42/96 |
| 2,692,069 | 10/1954 | Winters et al. | 224/275 |
| 2,884,172 | 4/1959 | Kubo | 224/913 X |
| 2,998,885 | 9/1961 | Surface | 224/913 X |
| 3,063,184 | 11/1962 | Sukala, Jr. | 42/96 |
| 3,497,077 | 2/1970 | Sjostrand | 211/64 |
| 3,653,564 | 4/1972 | Carter | 224/913 X |
| 3,802,612 | 4/1974 | Smith | 224/273 |
| 3,942,691 | 3/1976 | Sisak | 224/275 |
| 4,131,202 | 12/1978 | Hansen | 224/913 X |
| 4,280,644 | 7/1981 | Shindelka | 42/96 X |
| 4,531,643 | 7/1985 | Bradley | 211/64 |

*Primary Examiner*—Charles T. Jordan
*Assistant Examiner*—Michael J. Carone
*Attorney, Agent, or Firm*—Fleit, Jacobson, Cohn, Price, Holman & Stern

[57] ABSTRACT

A plastic tubular member is provided including a first open end a second closed end. The tubular member defines an interior cavity and the open end thereof is loosely telescopingly engagable over the muzzle end of an long gun. One end of a tether line is anchored relative to the closed end of the tubular member and the other end of the tether line is anchored relative to a vehicle seat mount.

11 Claims, 1 Drawing Sheet

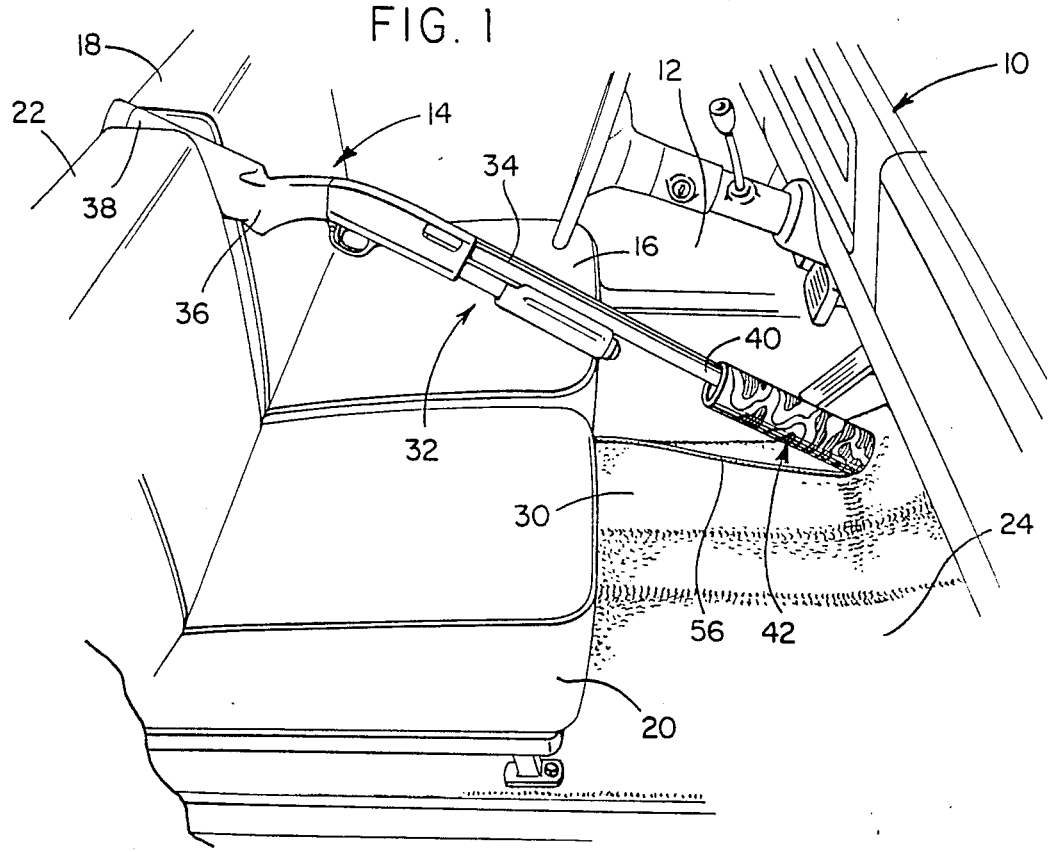
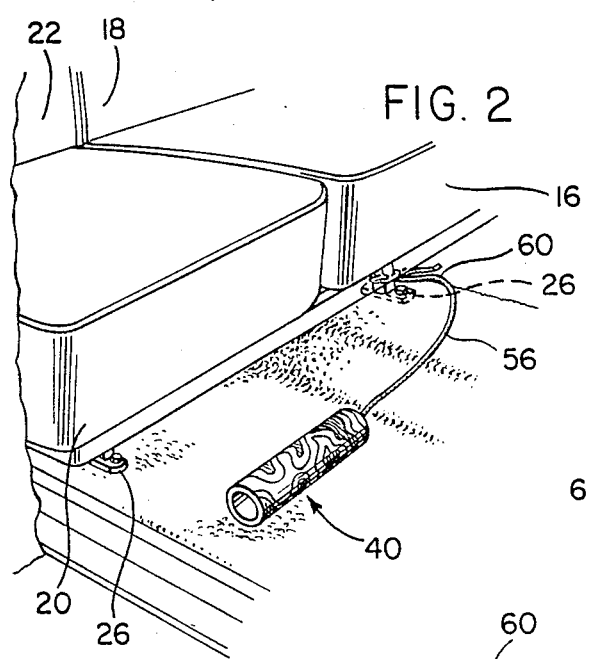
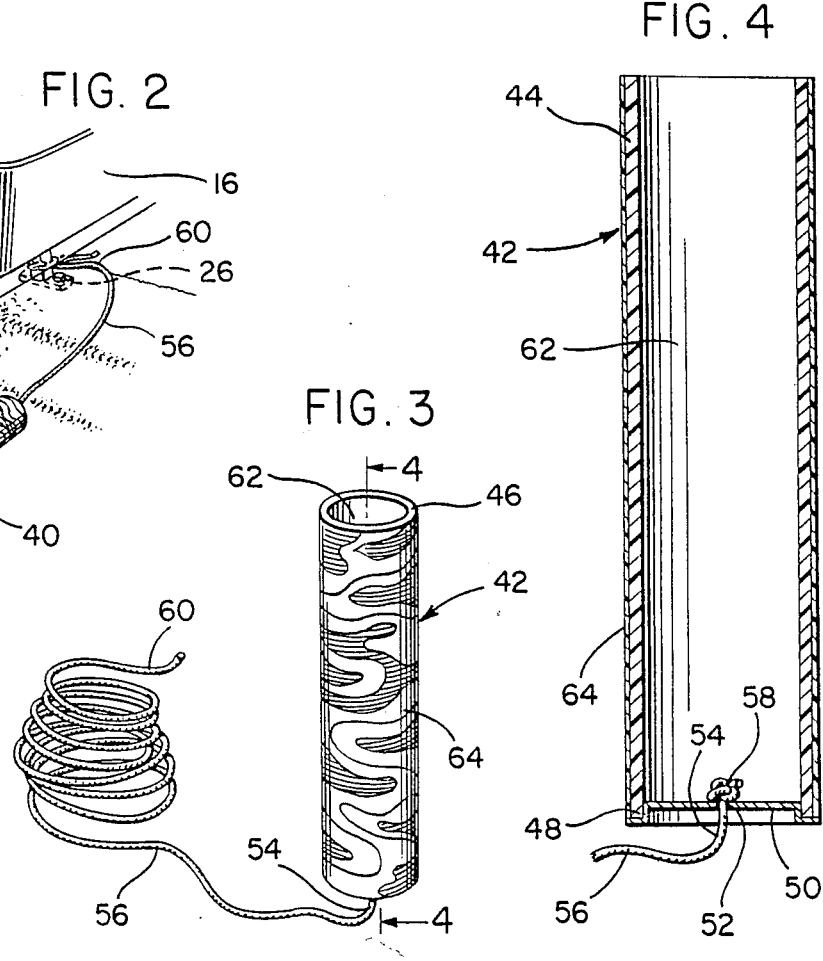
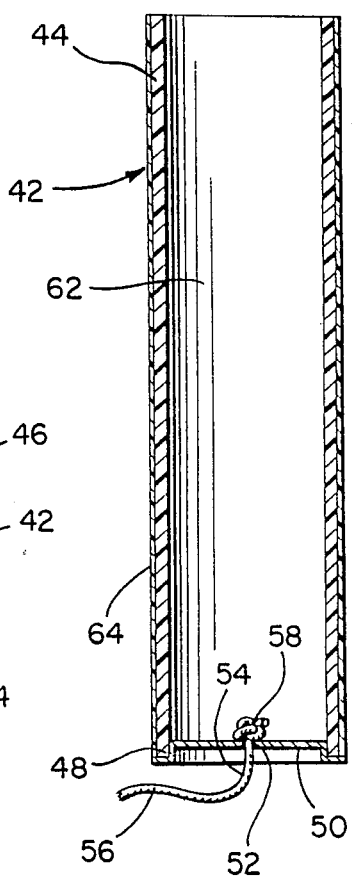

LONG GUN MUZZLE TETHER AND PROTECTOR

BACKGROUND OF THE INVENTION

1. Field of the Invention

This invention relates to a combined long gun muzzle tether and protector to be used when transporting long guns such as rifles and shot guns within a vehicle and with the associated long gun sported in muzzle downward inclined position from the floor of the vehicle and with the stock and butt end of the long gun disposed for resting upon the forward edge of an associated seat cushion and the corresponding seat back, respectively.

2. Description of Related Art

Various different forms of protective devices for long guns as well as muzzle covers and gun supports for vehicles heretofore have been provided such as those disclosed in U.S Pat. Nos. 2,287,805, 2,545,473, 2,558,792, 2,692,069, 3,063,184, 3,802,612 and 4,531,643. However, these previously known forms of protectors, covers, and supports are not operable in the same manner as the protector of the instant invention.

SUMMARY OF THE INVENTION

The long gun muzzle tether and protector of the instant invention comprises a cylindrical cover including a first open end and a second closed end and with the cover defining an interior cavity of at least generally 8 inches in length and 2 inches in width. In addition, the closed end of the cover is closed by an end cap to which a first end of an elongated flexible tether is anchored, the other end of the tether being adapted for securement to a vehicle seat mount.

The cover, therefore, may be manufactured at an extremely low cost and yet is fully operational to support a long gun within a seat equipped vehicle of the type wherein the seat is supported from flooring structure in elevated position relative thereto. The supported long gun is disposed in a safe, muzzle downward inclined position and the muzzle end of the barrel of the long gun is fully encased and protected against abrasion and dirt. In addition, the supported long gun may be readily disengaged from the muzzle tether and protector merely by upward and rearward displacement of the supported long gun relative to the associated vehicle.

The main object of this invention is to provide a long gun muzzle protector and tether constructed in a manner such that an associated long gun may be stationarily supported in a safe attitude within a seat equipped vehicle wherein the seat is mounted from the vehicle in an elevated position relative to a flooring portion of the vehicle.

Another object of this invention is to provide a long gun muzzle tether and protector which may be used in conjunction with various different forms and types of long guns without altering, or modifications being made to, the muzzle tether and protector.

Still another object of this invention is to provide a long gun muzzle tether and protector in accordance with the preceding objects and from which an long gun may be readily disengaged.

A further object of this invention is to provide a long gun muzzle tether and protector in accordance with the preceding objects and constructed of non-corrosive material.

Another important object of this invention is to provide a long gun muzzle tether and protector which will effectively encase the muzzle end of the barrel of a long gun against abrasion and dirt.

A very important object of this invention is to provide a long gun muzzle tether and protector for use in a vehicle and from which the associated long gun may be quickly withdrawn with the muzzle tether and protector being anchored to the vehicle and thus preventing the protector from being inadvertently left on the barrel of the long gun as the long gun is removed from the associated vehicle.

A final object of this invention to be specifically enumerated herein is to provide a long gun muzzle tether and protector in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the interior front seat area of a motor vehicle and with a typical form of long gun (shot gun) having the muzzle tether and protector of the instant invention operatively associated therewith and with a seat mount of the vehicle;

FIG. 2 is a further fragmentary perspective view of the interior of the vehicle illustrating the long gun muzzle tether and protector after removal of the long gun from the vehicle;

FIG. 3 is an enlarged perspective view of the long gun muzzle tether and protector;

FIG. 4 is an enlarged fragmentary vertical sectional view taken substantially upon the plane indicated by the section line 4—4 FIG. 3.

DESCRIPTION OF THE PREFERRED EMBODIMENT

Referring now more specifically to the drawings the numeral 10 generally designates a conventional form of vehicle such as a passenger car or truck including a front seat area 12 in which a front seat assembly referred in general by the reference numeral 14 is mounted. The front seat assembly 14 includes a drivers seat cushion 16 and seat back 18 as well as a passenger seat cushion 20 and seat back 22. However, the seat assembly 14 could be of the "bench-type" and include only a single seat cushion and a single seat back for both the driver and passenger. In addition, individual bucket seats could be provided.

The seat assembly 14 is mounted upon the vehicle floor 24 through the utilization of mounting brackets 26 and the floor 24 includes the center hump portion 30 usually associated with a rear drive vehicle, although the vehicle 10 could be equipped with a substantially flat floor 24.

The numeral 32 generally designates a long gun in the form of a shot gun incorporating a forwardly projecting barrel 34 and rearwardly projecting stock 36, the stock 36 including a rear butt end 38 and the barrel 34 including a forward muzzle end 40.

The long gun muzzle tether and protector of the instant invention is referred in general by the reference numeral 42 and incorporates an elongated cylindrical tubular member 44 constructed of plastic and including a first open end 46 and a second end 48 closed by an end cap 50 having a central aperture 52 formed therein through which one end of an elongated flexible tether line 56 is secured through the utilization of a knot 58. The other end 60 of the tether line 56 is anchored relative to one of the seat mounts 26.

The tubular member 44 defines an interior cavity 62 which is generally 8 inches in length and 2 inches in width, the tubular member 44 being cylindrical.

The end cap 50 is secured over the second end 48 of the tubular member 44 in any convenient manner and the exterior of the tubular member 44 is covered with a fabric cover 64, the cover 64 having a camouflage design.

In operation, the open end 46 of the tubular member 44 is readily loosely telescopingly engagable over the muzzle end 40 of the barrel 34. However, the tether line 56 (generally 3 feet in length) has the end 60 thereof anchored relative to the bracket 26 and the tubular member 44 is disposed on the hump portion 30 of the floor 24.

When it is desired to carry the long gun 32 within vehicle 10, the muzzle end 40 of the barrel 34 is telescoped into the tubular member 44 against the end cap 50 and the long gun 32 is positioned as illustrated in FIG. 1 of the drawings. The tether line 56 is anchored to the bracket 26 in a manner whereby the effective length of the tether member 56 is such that the tubular member 44 will be positioned as illustrated in FIG. 1, when the effective length portion of the tether line 5 is substantially taut. Then, when the long gun 32 is positioned as illustrated in FIG. 1, it will be stationarily positioned.

Of course, the stock 36 is received between the seat backs 18 and 22, but if the front seat assembly 14 is of the bench seat-type, the stock 36 will rest upon the forward upper edge of the seat back of such a bench-type seat and the long gun 32 will be slightly more inclined. In any event, the long gun 32 will be stationarily positioned in the vehicle 10 with the muzzle end 40 of the barrel 34 protected against abrasion and dirt.

Of course, if the floor 24 is relatively flat, the effective length of the tether line 56 is adjusted accordingly and, if desired, the tubular member 44 could be supported from the floor 24 on either side of the hump portion 30.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A long gun muzzle tether and protector primarily for use in temporarily storing a long gun in the front seat area of a motor vehicle, said protector including a tubular member having a first open end and a second closed end, said tubular member defining an interior cavity having an effective length of a least generally 8 inches and a width of at least generally 2 inches, and a flexible tether line having one end anchored relative to said tubular member at a location at least reasonably adjacent said second end and a second end adapted to be anchored to a vehicle front seat mounting bracket, said tubular member being adapted to have the open end of thereof loosely telescoped over the muzzle end of the barrel of a long gun, said tether line being generally 3 feet in length.

2. The tether and protector of claim 1 wherein said tubular member comprises a length of plastic tubing.

3. The tether and protector of claim 2 wherein said tubing is cylindrical.

4. The tether and protector of claim 2 wherein said closed end of said tubular member is closed by an end cap secured thereon.

5. The tether and protector of claim 4 wherein said one end of said tether line is anchored relative to said end cap.

6. The tether and protector of claim 1 wherein the exterior of said tubular member is provided with a fabric or paint cover.

7. The tether and protector of claim 6 wherein said fabric cover includes a camouflage design.

8. A long gun muzzle tether and protector primarily for use in temporarily storing a long gun in the front seat area of a motor vehicle, said protector including a tubular member having a first open end and a second closed end, said tubular member defining an interior cavity, a flexible tether line having one end anchored relative to said tubular member at a location at least reasonably adjacent said second end and a second end adapted to be anchored to a vehicle front seat mounting bracket, said tubular member being adapted to have the open end thereof loosely telescoped over the muzzle end of the barrel of a long gun with said muzzle end enclosed within said cavity, said tubular member comprising a length of plastic tubing and being cylindrical in configuration, said closed end of said tubular member being closed by an end cap secured thereon.

9. The tether and protector of claim 8 wherein said end cap is centrally apertured and said one end of said tether line passes and is secured through said aperture.

10. The long gun muzzle tether and protector of claim 8 wherein said tubular member includes a camouflage design exterior.

11. In combination with a vehicle of type including a seat mounted in elevated position relative to a floor area of the vehicle and wherein the seat includes a seat cushion and a seat back, a long gun including a barrel and a stock portion, a muzzle tether and protector for the muzzle end of said barrel, said protector including a tubular member having a first open end and a second closed end, said tubular member defining an interior cavity, a flexible tether line having one end anchored relative to said tubular member at a location at least reasonably adjacent said second end and a second end anchored relative to said seat adjacent said floor, said tubular member having the muzzle end of said barrel loosely telescopingly received in said cavity, said long gun stock being supported from said seat back and said closed end of said tubular member be engaged with said floor forward of said seat cushion, said tether member, in the area thereof extending between said tubular member and seat being generally taut.

* * * * *